R. F. BEUTLICH.
PASTEURIZING APPARATUS.
APPLICATION FILED FEB. 6, 1915.
1,251,465.
Patented Jan. 1, 1918.
6 SHEETS—SHEET 1.
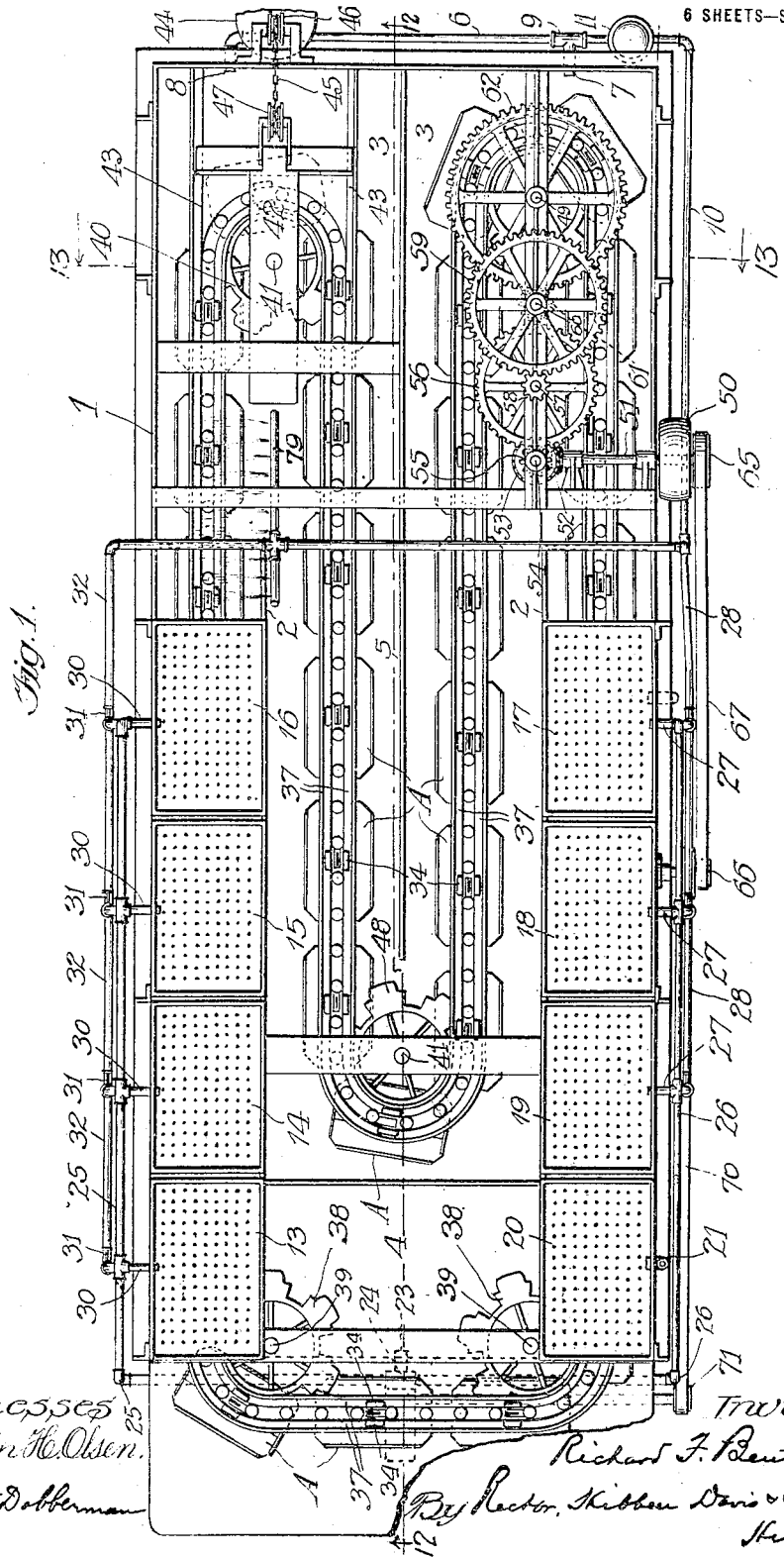
Witnesses
Martin H. Olsen.
Robert Dobberman
Inventor
Richard F. Beutlich
By Rector, Kibben Davis & Macauley
His Attys.

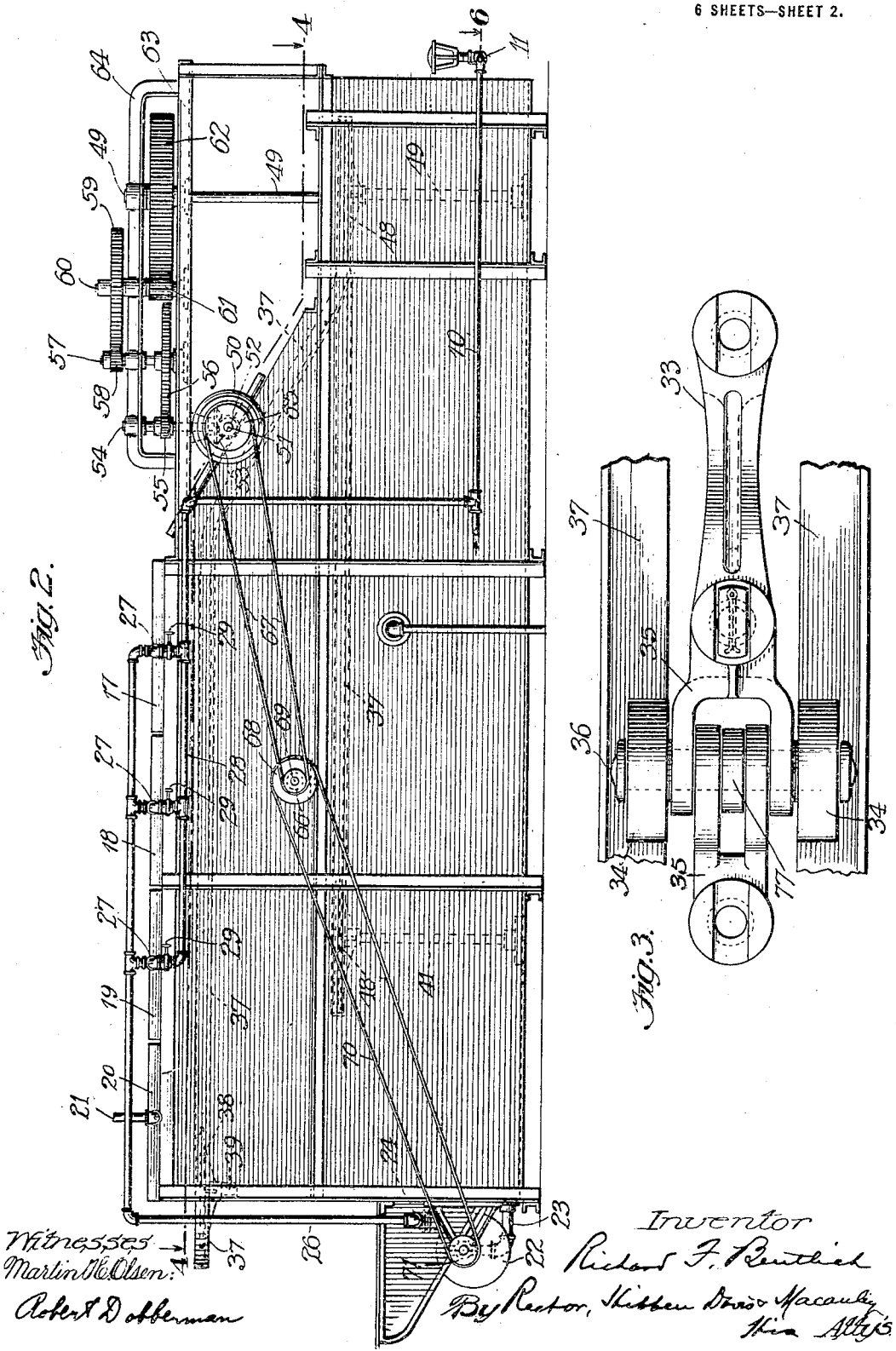

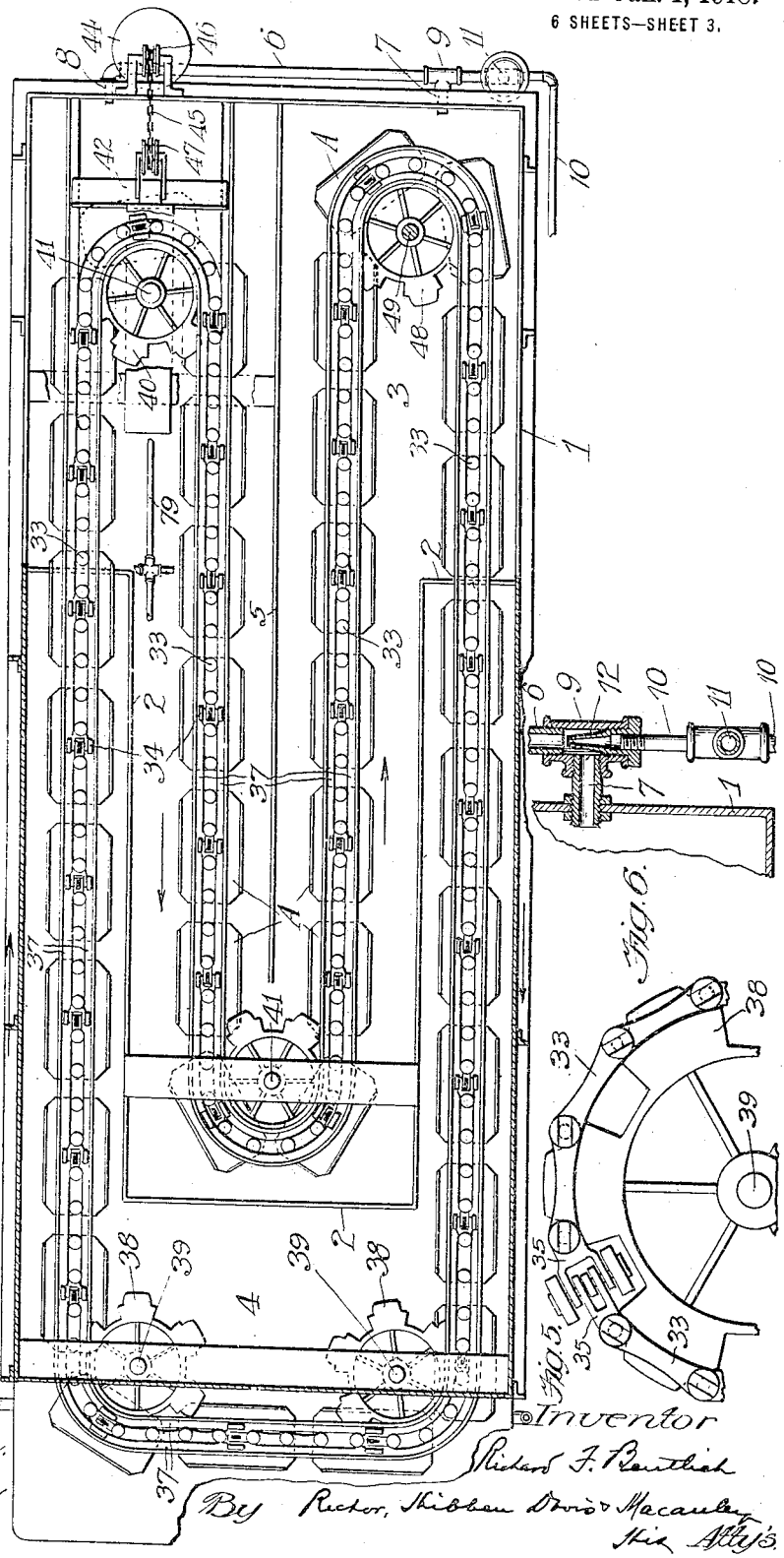

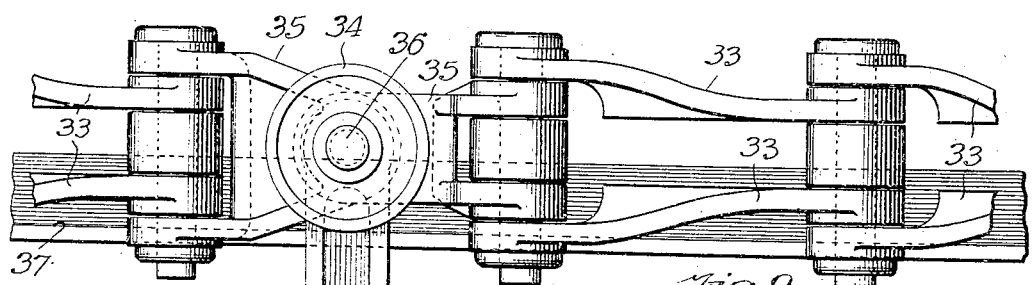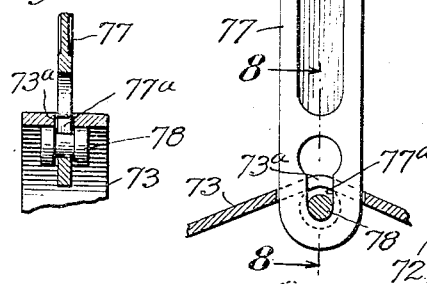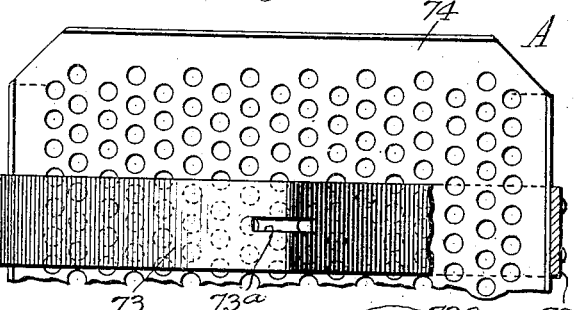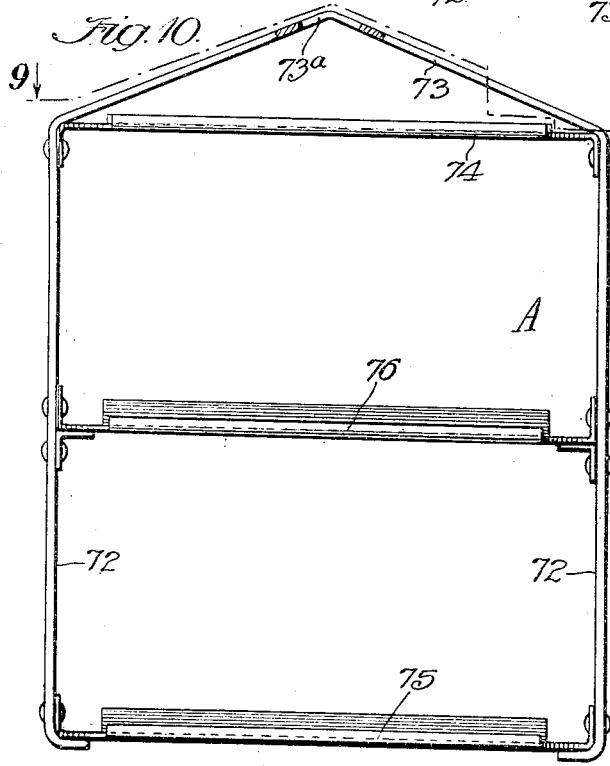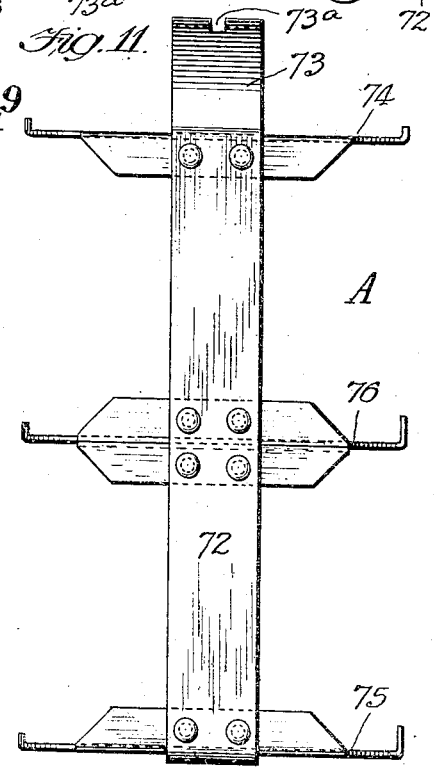

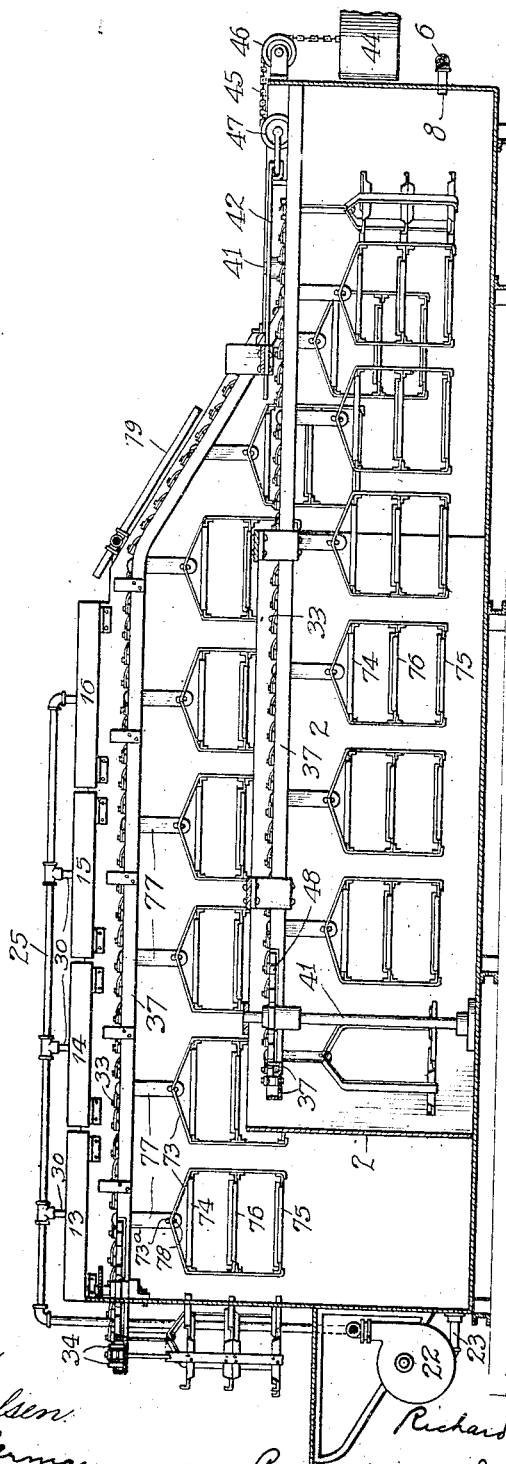

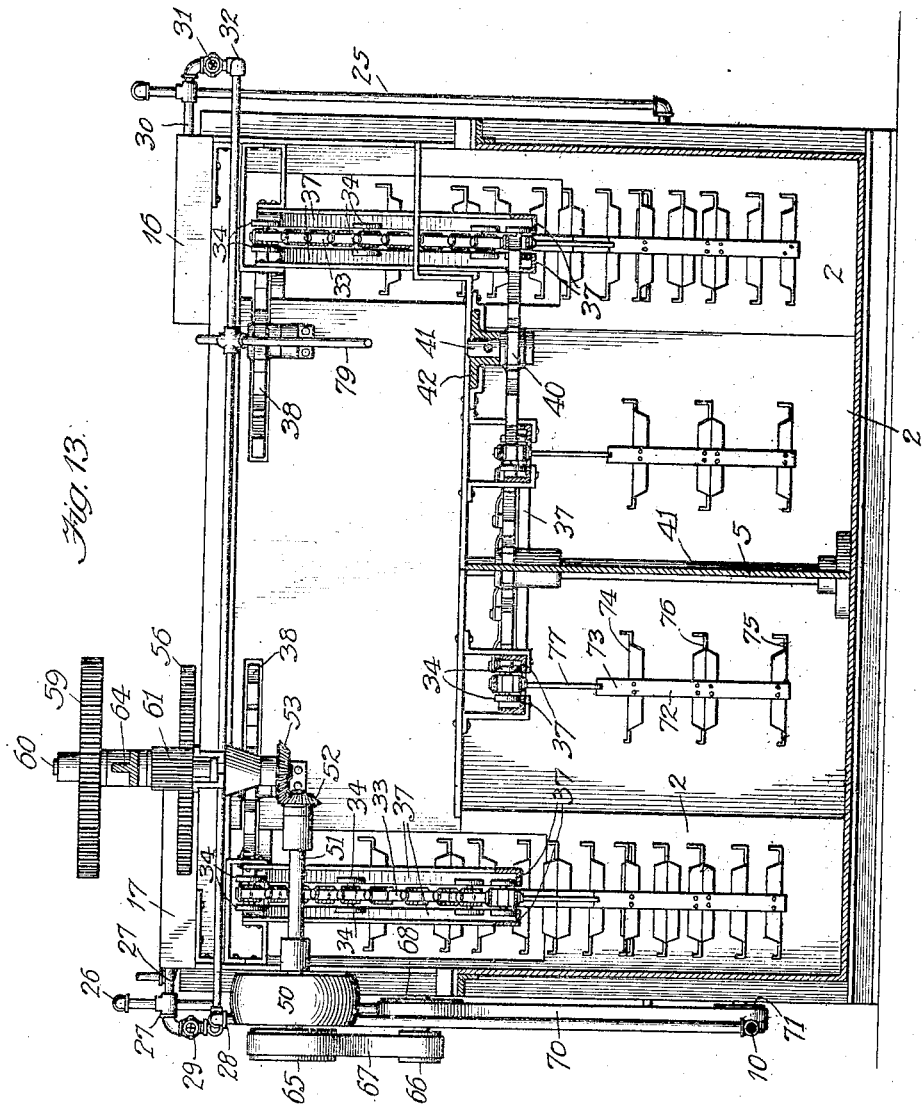

UNITED STATES PATENT OFFICE.

RICHARD F. BEUTLICH, OF CHICAGO, ILLINOIS, ASSIGNOR TO THE 20TH CENTURY MACHINERY COMPANY, OF CHICAGO, ILLINOIS, A CORPORATION OF ILLINOIS.

PASTEURIZING APPARATUS.

1,251,465.  Specification of Letters Patent.  Patented Jan. 1, 1918.

Application filed February 6, 1915. Serial No. 6,460.

*To all whom it may concern:*

Be it known that I, RICHARD F. BEUTLICH, a citizen of the United States, residing at Chicago, Cook county, Illinois, have invented certain new and useful Improvements in Pasteurizing Apparatus, of which the following is a specification.

My invention relates to an apparatus or machine for the pasteurizing of bottled liquids such as beer, and the object thereof is the production of a simple, efficient and reliable machine of this character. The various features of advantage and utility in my apparatus will be apparent from the description hereinafter given.

In the drawings Figure 1 is a plan view of my apparatus; Fig. 2 a side elevation thereof; Fig. 3 a detail view on an enlarged scale illustrative of the endless chain; Fig. 4 a sectional plan view on the line 4—4 of Fig. 2; Fig. 5 a detail view of a portion of one of the sprocket wheels and chain; Fig. 6 a horizontal section on the line 6 of Fig. 2; Fig. 7 another detail view of a portion of the endless chain; Fig. 8 a section on the line 8—8 of Fig. 7; Fig. 9 a sectional plan view on the line 9—9 of Fig. 10 but showing a portion of one of the carriers; Fig. 10 a side elevation of a carrier; Fig. 11 an end elevation thereof; and Figs. 12 and 13, sections on the lines 12—12 and 13—13 respectively of Fig. 1.

Referring to the particular embodiment of my invention as herein shown, the apparatus comprises a tank 1 which is of suitable shape and dimensions but which in the present instance is rectangular in form. This tank is divided by means of the transverse and longitudinally extending partition 2 into two separate compartments indicated at 3 and 4, which two compartments overlap each other. The compartment 3 at one end of the tank is of the full width thereof but is of a lesser width at the other end, while the compartment 4 at one end is of the full width of the tank and is provided with two parallel legs which encompass the compartment 3 at its lesser width, all as clearly illustrated in Fig. 4.

The two compartments 3 and 4 which are separate and independent, are adapted to contain the pasteurizing liquid, the compartment 3 containing the liquid such as water at a temperature of say about 140° F. in which the bottles are carried submerged. The other compartment 4 acts as a reservoir for the water applied to the bottles preliminary to their introduction into the compartment 3 and subsequent to their removal therefrom. The water in the compartment 3 is maintained at a constant temperature in automatic manner and the water in compartment 4 is used over and over again in different water compartments, as hereinafter described in detail.

The compartment 3 is provided with a central partition 5 which extends from the rear end of the tank and toward the front end but leaving a connecting space between the two subdivisions of the compartment 3. A by-pass connection is made for the pasteurizing liquid on opposite sides of the partition 5 by means of the pipe 6 which communicates through the connections 7 and 8 with the interior of the compartment 3. The by-pass pipe 6 is connected at one end by means of the T 9 with a steam supply pipe 10 having a thermostatically operated valve device indicated generally at 11 in Fig. 2. In case the temperature of the liquid in compartment 3 should be lower than a predetermined degree the valve opens to admit the steam through the nozzle 12 and into the by-pass pipe 6, thereby heating the water in said compartment and forcing a circulation therein by means of the injector action of the nozzle 12. As soon as the temperature of the liquid in the compartment 3 reaches the predetermined degree the thermostatic valve closes and shuts off the supply of steam.

On opposite sides of the tank and immediately above the parallel legs of the compartment 4 are arranged a series of receptacles having perforated bottoms through which the liquid at different temperatures is permitted to fall or spray upon the bottles being transported in the carrier through the apparatus. The direction of travel of the bottles is indicated by the series of arrows in Fig. 4 and consequently the bottles are first subjected to the action of the liquid in those compartments or receptacles shown at the top of Fig. 1 and indicated by the reference numerals 13, 14, 15 and 16. The bottles after traversing the compartment 3 as hereinafter explained, will then be subjected to the spraying action of the liquid in the compartments shown at the bottom of Fig. 1 and indicated by the reference numerals 17, 18, 19 and 20. The last receptacle 20 is a fresh water receptacle, being connected directly with a source of fresh water, shown at 21, whereas the remainder of the receptacles are connected with the compartment 4, the liquid being pumped thereto by a suitable pump and being heated to the proper temperature by means of separate valves for controlling the amount of steam admitted to the water being supplied to the different compartments.

A suitable pump as indicated at 22 draws the water from the bottom of the compartment 4 through an intake pipe 23 and discharges it through a discharge pipe 24 which has two branches 25 and 26 leading to opposite sides of the tank. The supply pipe 26 has a series of connections 27 for admitting the liquid (so pumped) to the different receptacles 13, 14, 15 and 16. The connections 27 also communicate with a steam supply pipe 28, the steam being controlled by independent valves 29, one for each of the connections 27. It will be understood that the temperature of the liquid supplied to the different compartments 17, 18 and 19 may be varied according to the amount of steam introduced to the liquid being supplied to these receptacles. The receptacle 17 will of course be supplied with the liquid at the highest temperature as compared with the temperature of the liquid in the other receptacles 18, and 19, while there will be a gradual lowering of the temperature in the receptacles 18 and 19.

In like manner the supply pipe 25 has a series of separate connections 30 to the different receptacles 13, 14, 15 and 16 and and separate steam valves 31 similar to the valves 29 controlling the supply of steam from the steam pipe 32 to the separate steam connections 30.

The conveying mechanism for conveying the bottles to the apparatus comprises essentially an endless chain adapted to travel on two different levels and a series of carriers on which the bottles are placed. The higher levels of the chain are those occupied by them when they are immediately below the series of receptacles 13 to 20 and the lower level is that occupied by the chains when their carriers are traversing the compartment 3.

The endless chain consists of a series of links 33 and rollers 34 as shown in detail in Figs. 3 and 7. The links are pivoted to a bifurcated bearing block 35 swiveled upon the cross pin 36 which forms the axis of the rollers 34. Another bearing block 35 is also swiveled upon the pin 36 and to its outer end the adjacent link 33 is pivotally connected. The rollers 34 run on horizontal tracks formed by the parallel angle irons 37 extending through the tank and supporting the chain and its carriers.

Referring to the sprocket wheels, the same are of the construction illustrated in Fig. 5 for accommodating the peculiar shaped chain, particularly the rollers 34. As shown in Figs. 1, 2 and 4, two horizontally disposed sprocket wheels 38 are located at the front end of the tank on vertical axes or shafts 39 which are suitably journaled. At its rear end the tank is provided with another horizontal sprocket wheel 40 carried at the end of a vertical shaft 41 and located on the lower level of the chain. This sprocket wheel has a take-up arrangement and to this end the same has its bearing in a sliding frame 42 arranged to slide on the tracks 43. This bearing and sprocket wheel are held toward the rear end of the machine with a yielding pressure by means of the weight 44 connected to a chain 45 running over the pulley 46 on the side of the tank and over the pulley 47 on the bearing. By these means the chain is kept taut. At its rear end the tank is provided with another sprocket wheel 48 similar to the wheel 40 except that its shaft 41 is mounted in fixed bearings. The two sprocket wheels 40 and 48 are both on the same level and are located within the compartment 3. The wheel 48 is the drive wheel of the endless chain and the same may be driven in suitable manner as by means of the driving connections now to be described.

As shown in Fig. 1 an electric motor 50 is located at one side of the tank and its extended armature shaft 51 drives a bevel pinion 52 which meshes with a bevel gear 53 secured to a vertical shaft 54. This shaft carries a pinion 55 meshing with a gear 56 secured to a vertical shaft 57 having at its upper end a pinion 58 which meshes with a gear 59. This gear is secured to a vertical shaft 60 to whose lower end is secured a pinion 61 meshing with a gear 62 which is secured to the extended shaft 49 or a separate shaft as may be desired. As shown in Figs. 1 and 2 the various shafts 54, 57, 60 and 49 have their bearings in a frame including the horizontal angle iron 63 and supplemental frame 64 extending above the line of the tank.

As shown in Figs. 1 and 2, the electric motor is also utilized to drive the water pump and for this purpose the armature shaft has a pulley 65 connected with another pulley 66 by means of the belt 67. The pulley 66 as well as a larger pulley 68 are secured to the same shaft 69 journaled in the side of the tank and such larger pulley 68 is connected by means of the belt 70 to the pulley 71 for driving the pump.

As shown in detail in Figs. 7 to 11, the bottle carriers are suspended from the endless chain and are thereby carried through the different receptacles and compartments of the apparatus in the pasteurizing operation. As shown each carrier which is indicated in the general views by the letter "A" is a frame consisting of opposite side members 72 connected together by the arched cross member 73 which may be integral with the side members. The members 72 are also connected at their upper portion by means of a horizontal cross piece 74. The lower ends of the side members are connected by a cross member 75 forming a lower shelf for the bottles and said side members are also connected intermediate their length with a cross member 76 forming an upper shelf for the bottles. It will be understood that the cross members 74, 75 and 76 are all perforated in order that the pasteurizing liquid showered from above will drop through upon the bottles carried by the carrier.

The endless chain has a series of depending links 77 pivoted upon the pins 36 of said chain. The lower end of each link passes through a slot 73ᵃ of its carrier and in order to removably attach the carrier to the link the fastening device illustrated in Figs. 7 and 8 is employed. The lower end of the link is provided with a slot 77ᵃ, the upper end of which is enlarged and of a size to accommodate one of the heads of a pin 78 whose intermediate or shank portion is adapted to fit into the lower or smaller width of slot 77ᵃ. In attaching the carrier to the link the parts are brought to such position that the larger end of the slot is brought to a position below the opening 73ᵃ and the pin 78 is thereupon inserted and dropped to its position shown in the lower end of the slot and the link 77 and its carrier will them assume the relative position shown in Fig. 7.

In operation the carriers are loaded with the bottles at the front end of the machine and are first conveyed on their upper level underneath the series of receptacles 13, 14, 15 and 16. The first mentioned receptacle supplies water which is slightly warmed, the temperature being under the control of the operator and the succeeding receptacles 14, 15 and 16 supply water at increasing temperatures, the last mentioned receptacle heating the bottles to a temperature approaching the temperature of the pasteurizing liquid in the compartment 3.

The carriers with their bottles after passing beyond the receptacle 16 travel downwardly in an inclined direction toward the sprocket wheel 40 and during the time of this inclined travel they are subjected to a side spray of heated liquid from the pipe 79 which is perforated on the side adjacent the line of travel of the carriers. Thereupon the carriers enter the liquid of the compartment 3 and are submerged therein while traveling in both directions on opposite sides of the partition 5. After passing beyond the sprocket wheel 48 the endless chain and carriers rise in an upwardly inclined direction to their upper level and underneath the receptacles 17, 18 and 19 where they are subjected to the action of water of different temperatures admitted thereto to the pipes 27 and showered upon the bottles below. The temperature of the showered water decreases from the receptacle 17. The receptacle 20 is the one which is provided with fresh water in order to give the bottles both a final cooling and a final cleansing. After passing the sprocket wheel 38 adjacent the receptacle 20 the bottles are removed from the carriers and new bottles are loaded thereon.

I claim:

1. In a machine of the class described, the combination of a tank divided vertically into two non-communicating compartments occupying opposite ends of the tank and overlapping as to their middle portions, and an endless conveyer having bottle carriers adapted to be drawn through a liquid in one of the compartments.

2. In a machine of the class described, the combination of a tank divided vertically into two non-communicating compartments occupying opposite ends of the tank and overlapping as to their middle portions, and an endless conveyer, bottle carriers depending from the conveyer and adapted to be drawn through a liquid in one of the compartments.

3. In a machine of the class described, the combination of a tank divided vertically into two non-communicating compartments occupying opposite ends of the tank and overlapping as to their middle portions, an endless conveyer, bottle carriers thereon adapted to be carried through a liquid in one of the compartments, and a series of devices for showering liquids on bottles in the carrier of increasing temperature in the direction of travel of the carriers.

4. In a machine of the class described, the combination of a tank divided vertically into two non-communicating compartments occupying opposite ends of the tank and overlapping as to their middle portions, an endless conveyer, bottle carriers thereon adapted to be carried through a liquid in one of the compartments, and a series of devices for showering liquids on bottles in the carriers of increasing temperature in the direction of travel of the carriers, said showering devices being arranged to drain into the other of said compartments.

5. In a machine of the class described, the combination of a tank divided vertically into two non-communicating compartments occupying opposite ends of the tank and overlapping as to their middle portions, an endless conveyer, bottle carriers thereon adapted to be carried through a liquid in one of the compartments, and a series of devices for showering liquids on bottles in the carriers of increasing temperature in the direction of travel of the carriers, each device comprising a plate having a series of perforations arranged to drain in the other of said compartments, and a pipe for supplying the liquid to the plate.

6. In a machine of the class described, the combination of a tank divided vertically into two non-communicating compartments occupying opposite ends of the tank and overlapping as to their middle portions, an endless conveyer, bottle carriers thereon adapted to be carried through a liquid in one of the compartments, and a series of devices for showering liquids on bottles in the carriers of increasing temperature in the direction of travel of the carriers, each device comprising a plate having a series of perforations arranged to drain in the other of said compartments, and valve governed steam and water pipes for supplying water to the plate at any desired temperature.

7. In a machine of the class described, the combination of a tank divided vertically into two non-communicating compartments occupying opposite ends of the tank and overlapping as to their middle portions, an endless conveyer, bottle carriers thereon adapted to be carried through a liquid in one of the compartments and two sets of devices for showering water on bottles in the carrier, one set on one side of the tank to shower water before the bottles enter said one compartment, and the other set on the opposite side of the tank to shower water after the bottles leave such particular compartment.

8. In a machine of the class described, the combination of a tank divided vertically into two non-communicating compartments occupying opposite ends of the tank and overlapping as to their middle portions, an endless conveyer, bottle carriers thereon adapted to be carried through a liquid in one of the compartments and two sets of devices for showering water on bottles in the carrier, one set on one side of the tank to shower water before the bottles enter said one compartment, and the other set on the opposite side of the tank to shower water after the bottles leave such particular compartment, and a separate spray device for spraying the bottles after passing beyond the first set of shower devices and before entering said compartment.

9. In a machine of the class described, the combination of a tank divided by partitions into two compartments overlapping at their middle portions, one compartment being T-shaped and the other U-shaped, and an endless bottle carrier located above the legs of the U of the latter compartment and arranged to pass downwardly into and to traverse the other compartment.

10. In a machine of the class described, the combination of a tank divided by partitions into two compartments overlapping at their middle portions, one compartment being T-shaped and the other U-shaped, an endless bottle carrier having upper reaches located above the legs of the U of the latter compartment and arranged to pass downwardly into and to traverse the other compartment, and showering devices adapted to coöperate with the carrier in its said upper reaches and arranged to drain into the U-shaped compartment.

11. In a machine of the class described, the combination of a tank divided by partitions into two compartments overlapping at their middle portions, one compartment being T-shaped and the other U-shaped, an endless bottle carrier having upper reaches located above the legs of the U of the latter compartment and arranged to pass downwardly into and to traverse the other compartment, and showering devices located above the carrier in the said upper reaches and arranged to drain into the U-shaped compartment.

12. In a machine of the class described, the combination of a tank divided by partitions into first and second non-communicating compartments, means on one side of the first compartment to gradually raise the temperature of the substance to be pasteurized, means on the other side of the same compartment to gradually lower the temperature of the substance to be pasteurized, and means for conveying the substance to be pasteurized along the first mentioned side of the first compartment through the second compartment and then along the second-mentioned side of the first compartment.

13. In a machine of the class described, the combination of a tank divided by partitions into first and second non-communicaing compartments, means on one side of the first compartment to gradually raise the temperature of the substance to be pasteurized, means on the other side of the same compartment to gradually lower the temperature of the substance to be pasteurized, and a bottle carrier arranged to pass along the first-mentioned side of the first compartment through the second compartment and then along the second-mentioned side of the first compartment.

14. In a machine of the class described, the combination of a tank divided by partitions into first and second non-communicating compartments, a bottle carrier arranged to pass along one side of the first compartment through the second compartment and then along the other side of the first compartment, showering devices delivering fluid of gradually increasing temperature on the first-mentioned side of the first compartment, and showering devices delivering fluid of gradually decreasing temperature on the second-mentioned side of the first compartment.

RICHARD F. BEUTLICH.

Witnesses:
S. E. HIBBEN,
ROBERT DOBBERMAN.